United States Patent [19]

Charpentier

[11] 4,345,875

[45] Aug. 24, 1982

[54] TURBO-MACHINES OPERATING AT THE MAXIMUM POSSIBLE EFFICIENCY

[76] Inventor: Jean F. Charpentier, 3 Rue du Pont de Madame Mille, 18190 Chateauneuf-sur-Cher, France

[21] Appl. No.: 211,838

[22] Filed: Dec. 1, 1980

[51] Int. Cl.³ .............................................. F01D 13/02
[52] U.S. Cl. ...................................... 415/69; 415/147
[58] Field of Search ........................ 415/60, 62, 63, 64, 415/65, 66, 68, 69, 146, 147; 60/39.16 S

[56] References Cited

U.S. PATENT DOCUMENTS

| | | | |
|---|---|---|---|
| 921,118 | 5/1909 | Kasley | 415/147 |
| 2,383,385 | 8/1945 | Heintze | 415/147 |
| 3,462,953 | 8/1969 | Wilde et al. | 415/69 |

FOREIGN PATENT DOCUMENTS 700222 11/1953 United Kingdom ................. 415/62

*Primary Examiner*—Louis J. Casaregola
*Attorney, Agent, or Firm*—Oldham, Oldham, Hudak & Weber

[57] ABSTRACT

New concepts of Components and Unities of Turbo-Machines based on a mathematical theory checked through experiments and permitting to predict the behaviour of a fluid particle subjected to a system of forces;

Structures enabling all types of Single and Compound Turbo-Machines to operate through new principles insuring the Maximum Possible Efficiency to these Machines.

1 Claim, 8 Drawing Figures

TURBO-MACHINES OPERATING AT THE MAXIMUM POSSIBLE EFFICIENCY

This invention relates to new concepts of Turbo-Machines structured for operating on several new principles, one of which is based on the fact that: whereas the Dynamic Power (further defined) of the solid bodies is only function of the square velocity of their motion:

$$P = F\,V = (\tfrac{1}{2})\,M\,V^2 \qquad (1)$$

the Dynamic Power of the Fluid Masses is a Function of the Cubic Power of their Mass-Flow Velocity, as by substituting for the Mass M, in Equation (1) the Mass M expressed by the second member of the Equation of Continuity:

$$M = \rho S V \qquad (2)$$

corresponding to a fluid of density $\rho$, section area S, flowing off at the Velocity V, it comes:

$$P = F\,V = \tfrac{1}{2} M\,V^2 = (0.5)(\rho S V)\,V^2 = (0.5)\rho S V^3 \qquad (3)$$

The first principle of the invention consists to utilize the form of Energy exhibited by Equation (3) that which requires to prevent the losses of charge in all the ways; and to that effect the Structures of the Turbo-Machines of the invention are designed in order to "Prime" the motion of the acting mass-flow everywhere it is possible;

The Primers of the invention are devices which, in order to convert at the Maximum Possible Efficiency the Energy of the Activating Fluids, never subject them to: high angle of attack, shocks, discontinuity, braking effect, and friction; but in an opposite manner change their direction or type of motion through "Soft processes" like: Induction, Tangential Solicitation, Contact with Smoothly Curved and Short Guides, on Polished Surfaces, Rotating Cylinders and "Confluence Through Aspiration" that is to say: with a decrease of the initial section area of a duct proportional to the increase of the mass-flow velocity; and with combination of all these processes in order to avoid the flow disturbances while enabling the streamlines of the activating mass-flow to permanently harmonize their behaviour to the variations of their motion parameters; This is the second principle of the invention;

The most striking natural example of "Primer" is the generation of the Tornados, or Hurricanes, which at some locations, like in the Caribbean Sea, take systematically origin at the same definite points as soon as the required conditions are satisfied, i.e.: when the Trade-Winds blow as a regular parallel flow and is "Primed" to start in curved trajectory by an insulated Hill on an Island with both combining an appropriate form for generating a "Potential Vortex" constituting the core of a Tornado; the formation of which could be avoid by suppressing, or at least preventing by change of configuration such a detrimental combination;

Considering the Transfer of energy between Active and Receiptive Unities like the Criterion of Efficiency, such a Function has been checked through series of tests performed with a Turbo-Machine further described, "Without Stationary Parts" comprising only Two Single Unities: an Accelerator and a Radial Turbine constituting a Torque-Converter, operating in free air, therefore Without Recuperation of the Kinetic Energy Carried Away in the Ejected Mass-Flow; the Selected Criterion was the "Turbine Torque Multiplicating Factor at Start, of the Turbine Motion of the Engine's Torque Activating the Accelerator" the average magnitude of which, in agreement with the theory, is equal to:

$$\mu = 5.50$$

Through combination of the structures of the invention it is possible to realise a "Converter of Fluid Energy," further described, for operating at very high efficiency, particularly interesting for recuperating the energy of the Sub-Marin Currents, and which allows it to generate any amount of Energy with unities much smaller than all the other ones in existence today;

In order to facilitate the understanding of the invention and to satisfy at once the "Specification Condition" as required in the Code of Federal Regulations, it is mathematically demonstrated now, how and why the conventional Active Turbo-Machines operate always at limited acceleration, as unable to take advantage of any additional increase: $\Delta V_o$, of the initial velocity: $V_o$, of their Activating Mass-Flow:

$$M_o = \rho S_o V_o;$$

Such a demonstration is based on the development of a "Theory of Impulse for Fluids" which must agree with the "Principle of Energy" something which so far does not exist;

The First Parameter required for developing this Theory is the "Length of the Fluid Volume" accelerated at once by the Actuator Disc of the considered Turbo-Machine, which is obtained as follows:

In agreement with theory experiments show that:

The distance extended between the Upstream Boundary Section an Actuator Disc starts to accelerate the ambient fluid and its own active plane, is equal to 20% of its diameter; $\phi_{AD}$, and:

The distance from same Actuator Disc to the Downstream Section the Acceleration is Achieved, is equal to 80% of its diameter;

Therefore the total length of the cylindrical fluid volume accelerated by an Actuator Disc is equal to the Diameter: $\phi_{AD}$, of its own Disc Area: $S_{AD}$; and because this accelerated volume is always smaller than the volume: $v_o$ of the coming Mass-flow: $M_o = \rho\,v_o = S_{AD}V_o$, it will be denoted: Sub-Unit-Volume: $v_1$, with the index "1" referring to the Fluid-Mass activated by the Actuator Disc, and such a Fluid-Mass denoted: Sub-Unit-Mass-Flow $M_1$;

The above relationship permits to evaluate the Sub-Unit-Volume $v_1$ of the Sub-Unit-Mass-Flow $M_1$ and density $\rho$, subjected to the acceleration of the Actuator Disc, volume which is equal to the product of its Section Area: $S_{AD}$, by its length equals to its Diameter: $\phi_{AD}$, or:

$$v_1 = S_{AD}\phi_{AD} \qquad (4),$$

from which comes the expression of the corresponding Sub-Unit-Mass-Flow $M_1$:

$$M_1 = \rho v_1 = \rho S_{AD}\phi_{AD} \qquad (5)$$

Because the initial velocity: $V_o$ of the Mass-Flow $M_o$ entering the Actuator Disc is the Length of the Unit Mass-Flow $M_o$:

$$M_o = \rho v_o = \rho S_{AD} V_o \quad (6)$$

and with the Section Area: $S_{AD}$ of constant magnitude, the Ratio of the Length: $V_o$ of the Mass-Flow $M_o$, to the Length: $\phi_{AD}$ of the Sub-Mass-Flow: $M_1$, determines the Number: N, of said Sub-Unit-Mass-Flow: $M_1$ Accelerated During One Second Unit of Time by the Actuator Disc of the Active Turbo-Machine:

$$V_o/\phi_{AD} = N \quad (7)$$

and the inverse of the Number N determines the Sub-Unit-Time:

$$t_{su} = 1/N \quad (8)$$

The Accelerating Force: $F_{x1}$ = Constant, applied on the Sub-Unit-Mass-Flow $M_1$, by the Actuator Disc transmits to same the Axial Acceleration: $\gamma_{x1}$, so that:

$$F_{x1} = M_1 \gamma_{x1} = M_1 \, dV/dt \quad (9)$$

which can be identically written in the form of "Instant Action:"

$$F_{x1} \, dt = M_1 dV \quad (10)$$

then multiplying both sides by $V_1$ in order to obtain a consistent expression of "Instant Power" and Integrating yields:

$$\int_0^{t_{su}} F_{x1} V_1 \, dt = \int M_1 V_1 \, dV \longrightarrow \quad (11)$$

$$F_{x1} V_1 t_{su} = \frac{M_1 V_1^2}{2} + C^t$$

Expression denoted as the "Dynamic Power" transmitted to the Sub-Unit-Mass-Flow $M_1$, during the Sub-Unit-Time: $t_{su}$;
At the instant origin: t=0, the initial velocity of the entering Mass-Flow is equal to $V_o$, the constant of integration is therefore equal to:

$$C^t = -M_1 V_o^2/2 \quad (12)$$

so that complete Equation (11) takes the final form:

$$F_{x1} V_1 t_{su} = (M_1 V_1^2/2) - (M_1 V_o^2/2). \quad (13)$$

Noticing that the product: $V_1 t_{su}$ expresses the Diameter $\phi_{AD}$, so that:

$$V_1 t_{su} = \phi_{AD} \quad (14)$$

& Equation (13) represents, in a new form, the Principle of Energy which states that:
"The total change in Kinetic Energy of a Material Particle in motion is equal to the Work done by the Active Force along the corresponding Displacement;"
Now, from Equation (13) comes out the "Exact expression of an Impulse:"

$$I = M_1(V_1^2 - V_o^2)/2V_1 = F_{x1} t_{su} \quad (15)$$

which is defined as follows: "An Impulse is the semi-product of a Mass by the Difference between the Square Power of its Final and Initial Velocities, Divided by its Final Velocity"

Solving Equation (15) relatively to the Velocity $V_1$ gives:

$$V_1 = \frac{F_x t_{su} + \sqrt{F_x^2 t_{su}^2 + M_1^2 V_o^2}}{M_1} \quad (16)$$

Now back to Equation (15) and substituting in, for $t_{su}$ its identical value: 1/N, from Equation (8), and for $F_{x1}$, its identical value: $M_1 \gamma_{x1}$, from Equation (9); Equation (15) becomes:

$$\frac{(V_1^2 - V_o^2)}{2 V_1} = \frac{\gamma_{x1}}{N} \quad (17)$$

from which comes out the specific Equation of the Velocity $V_1$ transmitted by the Impulse of an Active Turbo-Machine:

$$V_1^2 - (2\gamma_{x1}/N)V_1 - V_o^2 = 0 \quad (18)$$

Which yields for the Velocity $V_1$ at the Outlet of the Active Turbo-Machine:

$$V = \frac{\gamma_{x1}}{N} - \sqrt{\frac{\gamma_{x1}^2}{N^2} - V_o^2} \quad (19)$$

Because the Magnitude: N=1, is the minimum possible for this parameter, as corresponding to: $\phi_{AD} = V_o$, Equation (16) demonstrates: That for N=1 the Velocity $V_1$ is Maximum:

$$V_1 = \gamma_{x1} + \sqrt{\delta_{x1}^2 + V_o^2}$$

And that the Term: $\gamma_{x1}/N$, of Equation (19) is a Rectangular Hyperbolic Function of the First Degree of N (Form: Y=1/X) therefore small increase of the Parameter N generates a rapid decrease of the Velocity $V_1$, which tends towards the Magnitude $V_o$ as soon as N appreciably increases;

Such a Physical-Mathematical Picture explains at once How and Why some concepts of "Machines Looking Good a Priori" never have been coming out!

The Third Principle of the invention consists to provide the Active Turbo-Machines with All the Required Means, further described, for Eliminating such a Detrimental Limitation to their Efficiency;

The Structures of the invention are available to all single and compound types of Turbo-Machines, With the Single Types comprising: Pumps, compressors, Blowers, Turbines, Propellers, and from the invention: one denoted "Helical-Radially-Spiraled Accelerator" and another one denoted "Composite Turbine" With the Compound Types comprising: Hydrodynamic Couplings, Hydrodynamic Transmissions, Torque Converters, Turbo-Jet and Turbo-Fan engines, Turbo-Propellers; and from the invention: two "Converters of Fluid Energy" one for liquids and one for gases, for operating through opened cycle, and one "Hydrodynamic Fluid-Clutch-Torque-Converter" for operating through closed cycle;

The Compound Turbo-Machines denoted "Converters of Fluid Energy" operate on a new principle which consists as follows: "To Utilize a Fraction of Energy of the Activating Mass-Flow passing through the Actuator Disc of the Converter, for Accelerating the Complementary Fraction of said Activating Mass-Flow" in order to obtain the advantage of very High Efficiency as promised by the Equation (3);

In the Drawings:

FIG. 1 is a diametric longitudinal cross-sectional view of a Compound converter of Fluid Energy operating as Opened System set in operation by the external flow power, comprising a combination of Receiptive and Active Unities utilizing the Dynamic Power of the Fluid, in the form expressed by the Equation (3): $P = (0.5)\rho SV^3$ where: $\rho$ is the Fluid Density, S the Section area of the Stream;

Figure 1:
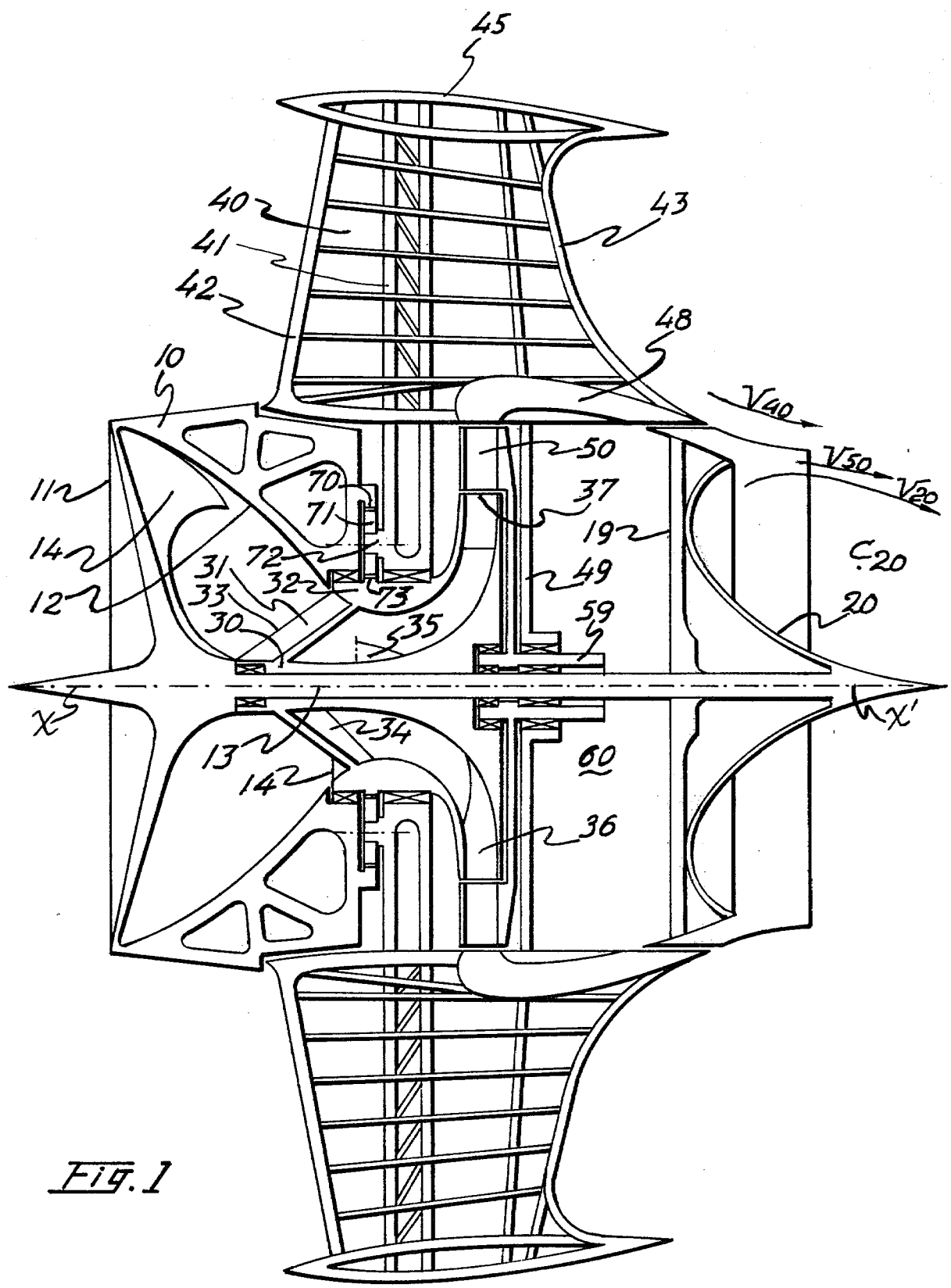
Figure 4:
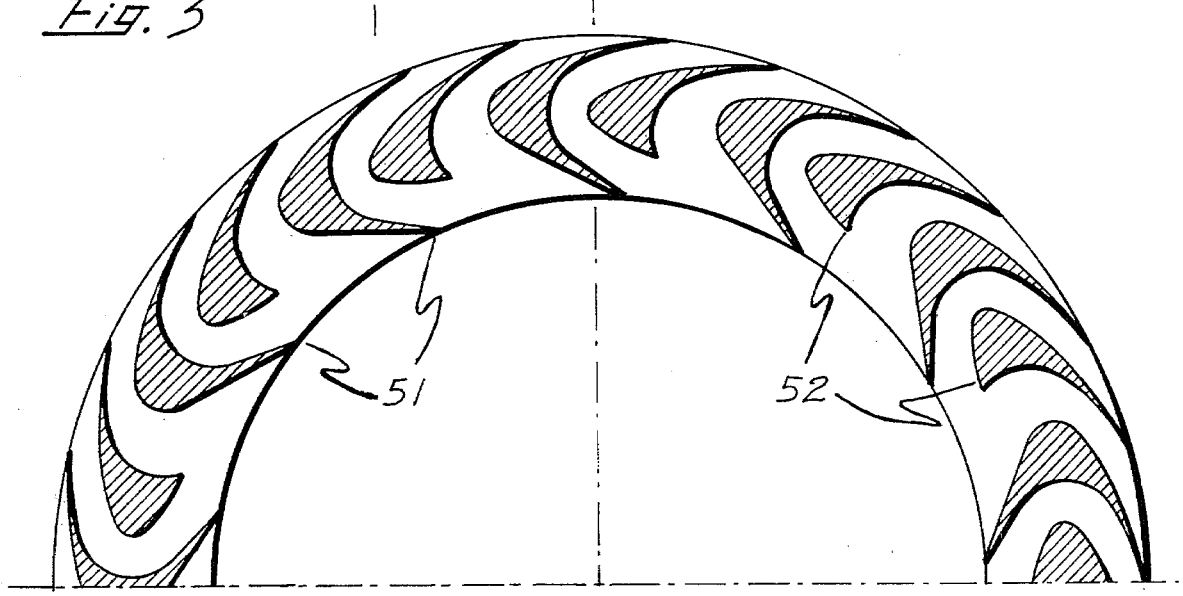
Figure 5:
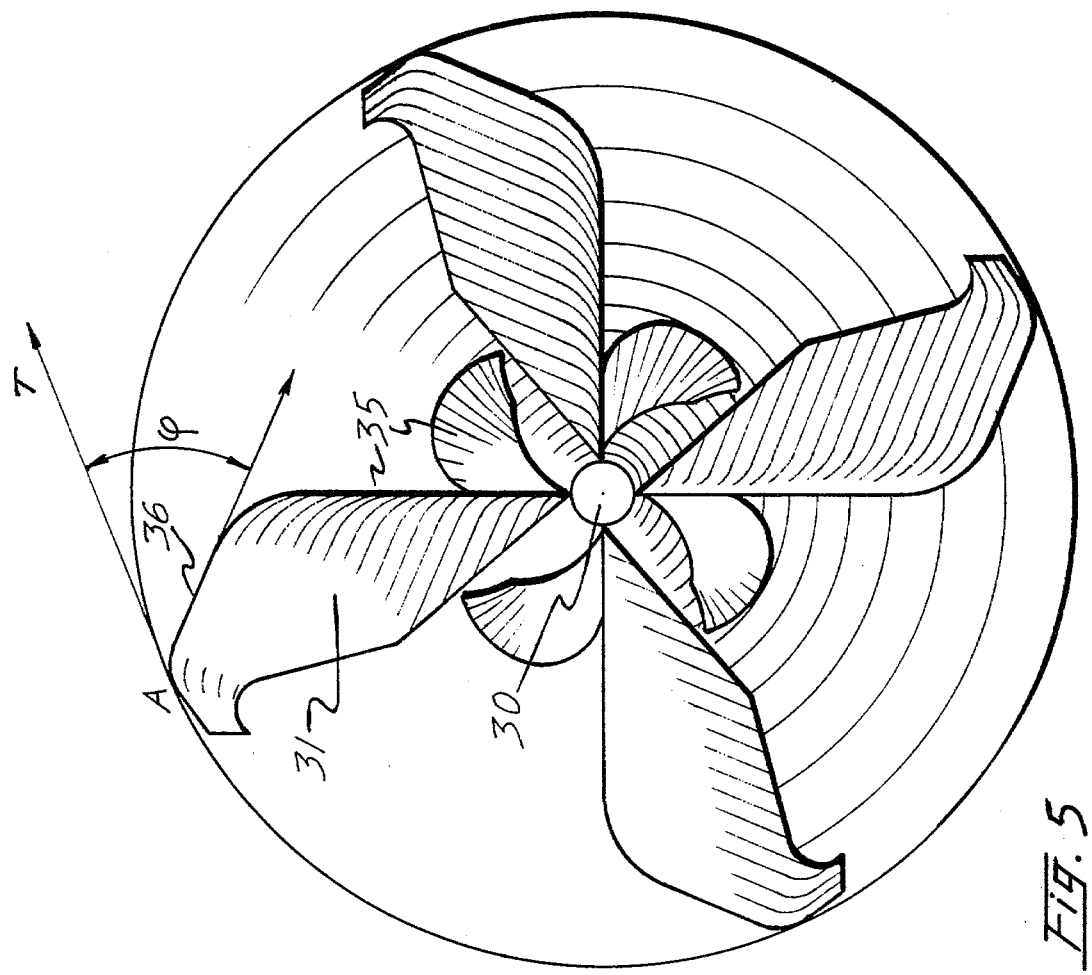
FIG. 5 is a perspective view of an Accelerator corresponding thoroughly to the Theory.
Figure 6:
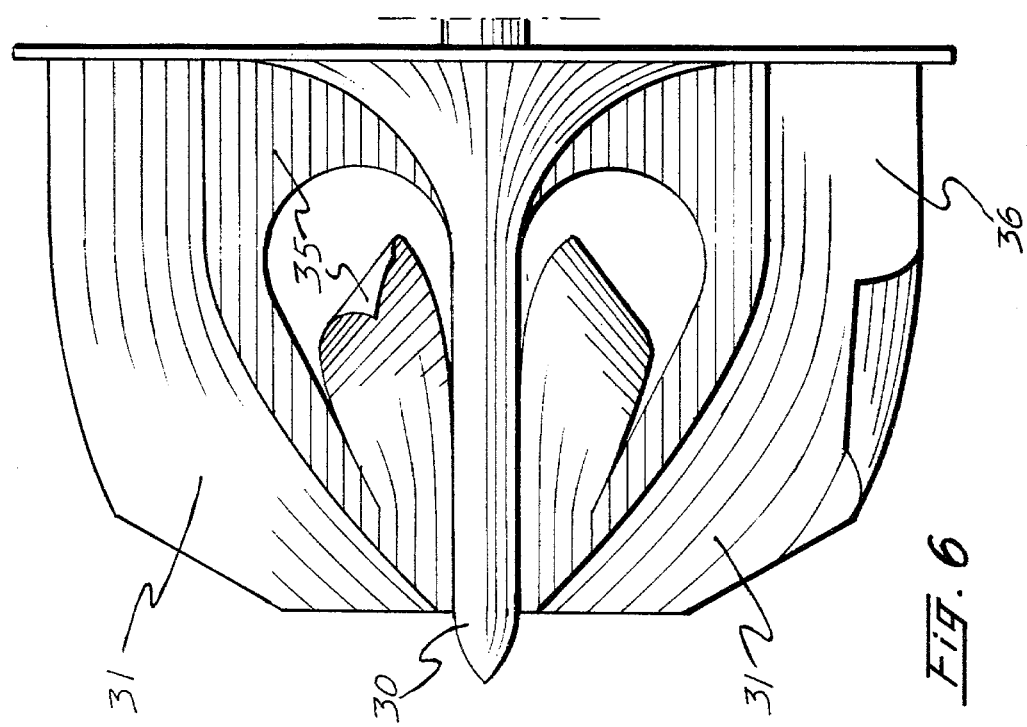
FIG. 6 is a frontal sectional view of the Receiptive Single Unity denoted "Composite Turbine;"
Figure 8:
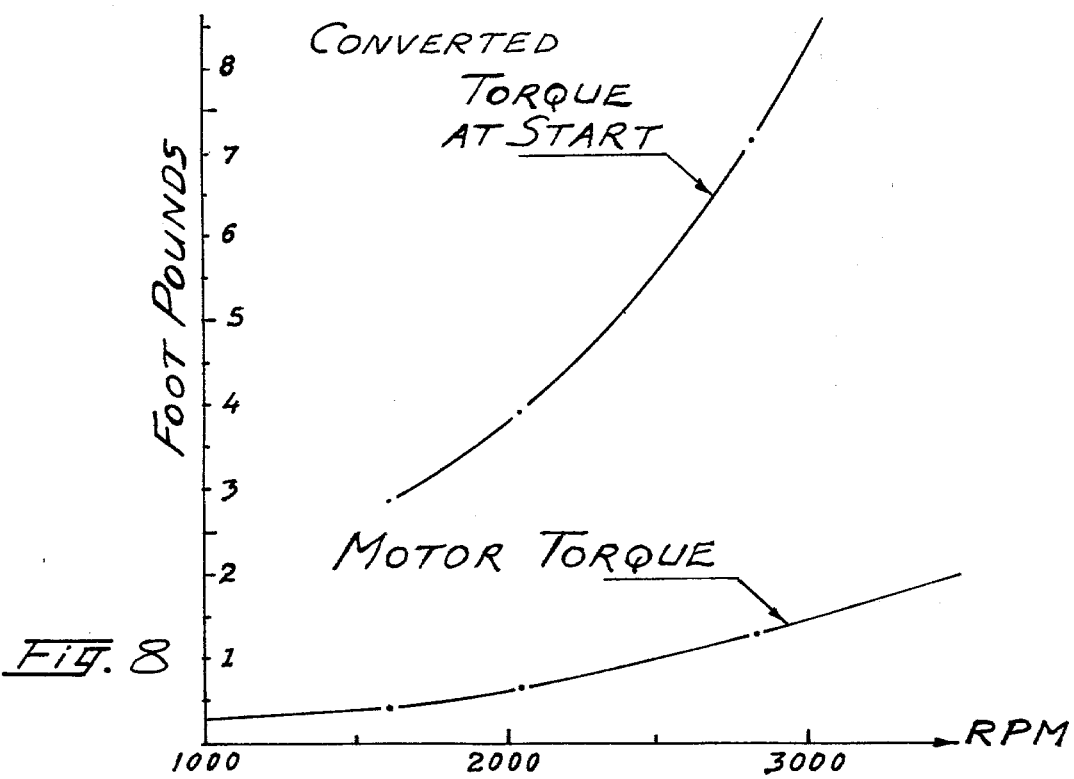
FIG. 8 illustrates two Functional Curves obtained with an experimental machine comprising two single unities.

(1) The Central Accelerator of FIGS. 5 and 6, carried in rotational motion by a motor, the Torque of which is represented as a function of the R.P.M. for independent variable, by the lower curve, (2) The Composite Turbine of FIG. 4 mounted around the Accelerator for multiplying its activating Motor Torque, The upper curve of FIG. 8 represents as a function of the R.P.M. of the Accelerator, therefore of the Motor, the "Multiplication of the Motor Torque at the Starting Motion of the Turbine," Criterion of Efficiency selected as the best Factor of the transferred Energy;

As the compound Turbo-Machines now described comprise some similar or identical single unities, on the drawings such unities are denoted by the same number, and the following numerals denote: 10 a Support or Casing; 30 an Accelerator; 40 an Axial Turbine; 50 a Radial Turbine;

The compound Turbo-Machines denoted "Converters of Fluid Energy" described thereafter, operate through a new principle which consists: "To Utilise a Fraction of Energy of the Activating Mass-Flow Passing through the Actuator-Disk of the Converter, for Accelerating the Complementary Fraction of said Activating Mass-Flow", in order to get advantage of the very High Efficiency as promised by Equation (3);

The Converter illustrated in FIG. 1 is available for All Fluids, and with the required means for taking support on either: the bed of the Sea, conventional or Sub-Marine Floats, Fixed or Vaning Systems, Tower or others, it provides the ideal solution for converting the energy of the Tides and of the Sub-Marine Currents, a source of Infinite Energy as permanently regenerated from Geothermy on the inner side, and from the Sun Energy on the outer side while available all over the Seas of the World, that is to say: on 73% of the total area of our Planet;

This Converter comprises four components:

(1) A structured Fixed Body 10, constituting the Central Part and the Support of the Converter, with a frontal Inlet 11, opening of an Axial Converging Channel 12, designed for converging the entering Mass-Flow $M_o$ towards the longitudinal axis: XX of the Fixed Body 10 and with a Fixed Central Shaft 13, on which are mounted free to rotate:

(2) An External-Axial-Turbine 40, with its Blades radially extended around the Fixed Body 10, which in circling generate the External-Annular-Actuator Disk of the Converter; and with the effective Energy recuperated by the Axial Turbine 40 from the Activating Mass-Flow, transmitted in mechanical form to:

(3) A Central Accelerator 30, which is at once a Receiptive and Active Unity: Receiptive as receiving simultaneously the energy from the Activating Central Mass-Flow $M_{OC}$ (index c helds for central) entering the Inlet 11, of the Convergent Channel 12; and the Effective Energy from the External-Axial Turbine 40, converted into mechanical form and transmitted on, in positive direction through the following Planetary System of Gears comprising:

The Internal Gear Ring 70, integral with the Fixed Body 10, that meshes with a series of Planetary Gears 71, mounted free to rotate on the Axis 72, integral with the Spar 41, of the Blade 40, and which are meshing all together with the Sun Gear 73, integral with said Accelerator 30, which is also and simultaneously: an Active Unity as transmitting through High Acceleration, "All the Effective Energy recuperated by the External Axial Turbine 40, from the Activating Mass-Flow $M_{OA}$ passing through its Annular Actuator Disk (index A helds for annular) to said Active Converging Central Mass-Flow $M_{OC}$,"

Figure 2:
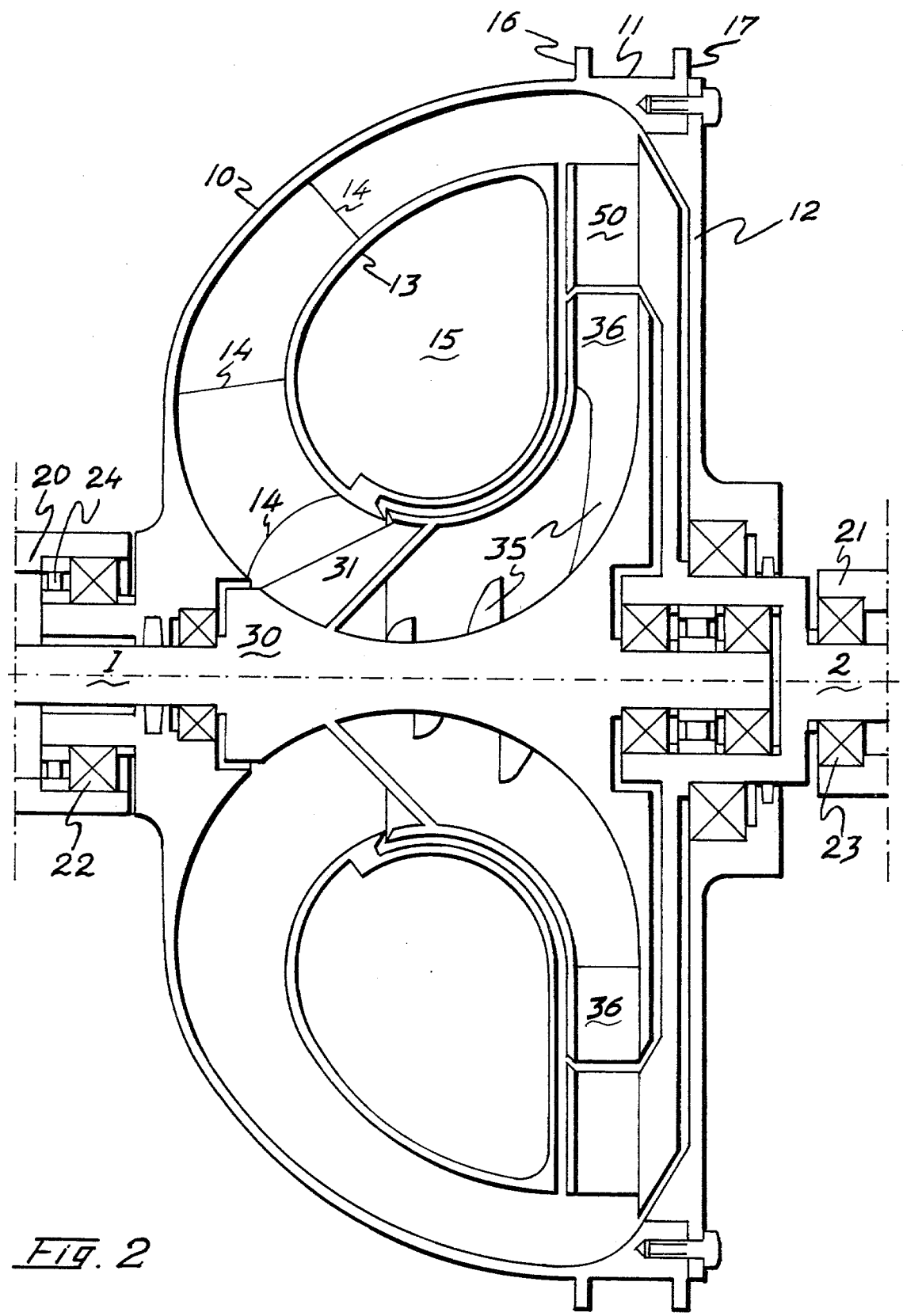
FIG. 2 is a diametric longitudinal cross-sectional view of an Hydrodynamic Fluid-Clutch-Torque-Converter operating as close system, the Active Unity of which is set in operation by some external source of power while the receiptive one acts at once as a Fluid Clutch and a Torque-Converter.
Figure 3:
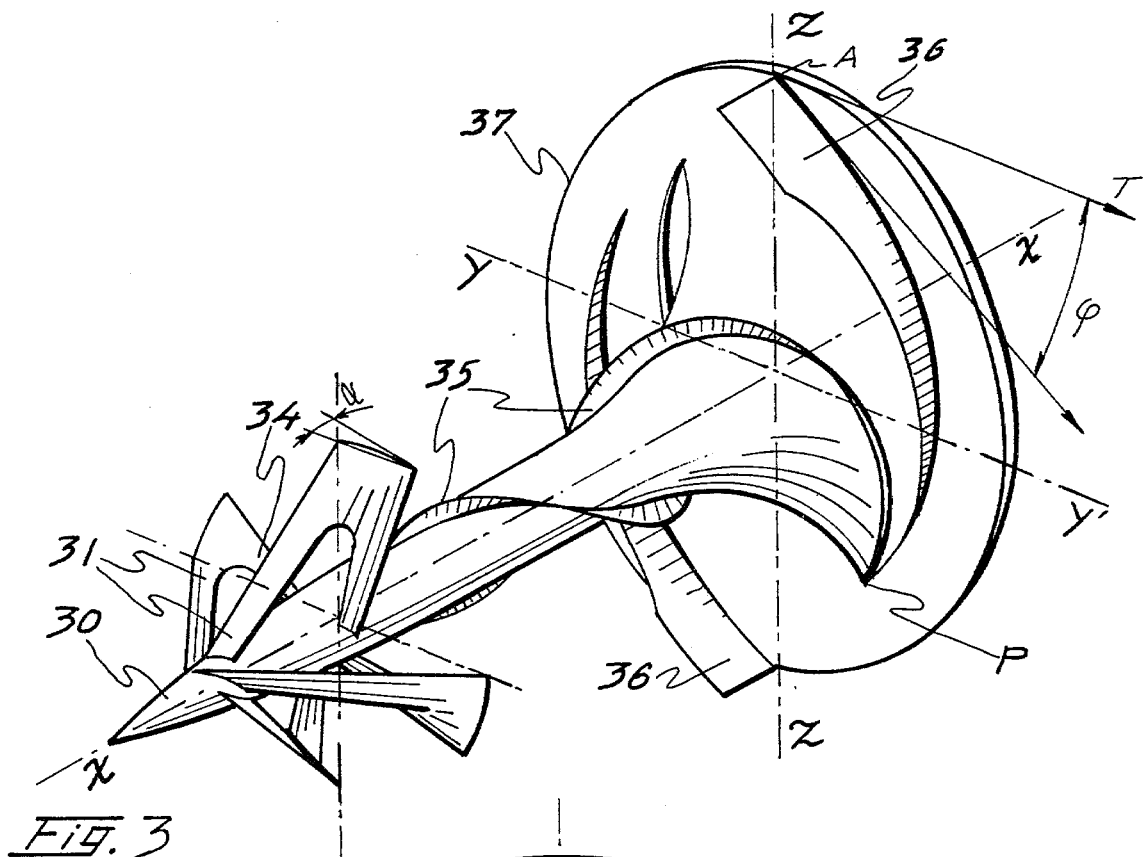
FIGS. 3 and 4 are respectively the external frontal and longitudinal views of a compact, experimental Single Active Unity denoted "Accelerator;"

(4) A receiptive Unity or "Radial Turbine" 50, set in rotational motion by the Central-Mass-Flow $M_{OC}$ accelerated at high velocity through the Accelerator 30, so that said Central-Mass-Flow $M_{OC}$ contains the Effective Energy of the Activating Mass-Flow flowing through the Total Area of the Central and Annular Actuators Disks of the Converter; and from the Theory of the invention, by virtue of the Equation (3) this Mass-Flow $M_{OC}$ is ejected in the form of a Mass-Flow of much smaller Section Area than that of the Total Actuator Disk, but at much higher velocity so that the Efficiency of this Converter has an incredible magnitude;

All these unities are interdepending and designed for that the Functions of each one help the following one to fulfill its own Functions at the Maximum Efficiency;

In addition to the Convergent Channel 12, and the Central Shaft 13, on which are mounted all the mobile components of the Converter, the Structure of the Fixed Support 10 comprises several Radial Primers 14 connecting the Central Fixed Shaft 13, to the Channel Surface for either: guiding in straight direction or for Priming in a slow helicoidal positive or negative motion the streamlines of the Central Mass-Flow $M_{OC}$ entering the Inlet 11; Said Fixed Support 10, also comprises a Chamber of Machines 60, location of the Transformers or Transmitters (non illustrated) of the Mechanical Energy delivered by the motor shaft 59, of the receiptive Turbine 50, the cylindrical volume of which is extended between the rotating Flange 49, of the External-Radial Turbine 40, and the Fixed Flange 19, of the Fixed Support 10, on which is fixed the selected type of power transmitter; and, finally, the rear part of the Fixed Support 10, constitutes an Exhaust Partial Concave Elliptical Toric Primer 20, designed for that the upper imaginary contour of said Primer be adjacent to the Mass-Flow $M_{40}$ ejected downstream by the External-Axial Turbine 40, all around said central part, through its curved trailing edges, for that the Mass-Flow $M_{50}$ ejected by the receptive Turbine 50 comes out in sandwich position between the rotating fluid mass $M_{20}$ and the Mass-Flow $M_{40}$ ejected by the External Axial Turbine 40;

As illustrated in FIG. 1, the Radial Turbine 50, discharges its Mass-Flow in a Prime-Collector 48, integral with the External-Axial-Turbine 40, therefore rotating in the same positive direction in avoiding all resistance; and the ejection angle of the Mass-Flow $M_{50}$, depends upon the Prime Collector 48, that which allows to select such a direction for which its Axial Velocity Component $V_{50}$ is smaller than that $V_{40}$ of the Mass-Flow $M_{40}$; Under this condition, by induction through friction, an advance per turn, and therefore an Acceleration, can be transmitted to it by the Mass-Flow $M_{40}$, for increasing its velocity when flowing before ejection between the blades of the Radial Turbine 50, and to contribute in this way at the efficiency of the Converter;

The Fluid-Clutch-Torque-Transformer illustrated in FIG. 2, comprises 3 Unities:

(1) A Casing, the longitudinal form of which is a quasi-Hemisphere 10 terminated by a short co-axial Cylinder 11, closed by a removable cover 12 on its rear side, with eventually two guiding flanges 16 and 17 on the cylindrical part 11; with an inner wall 13, for constituting a double wall internal structure providing first: a Quasi-Annular-Torus 14 containing the activated fluid, and surrounding: an inner Torus 15 able to contain a cooling fluid; With said Casing 10 supported in front and rear by a fixed structure, respectively 20 and 21, through rollers bearings 22 and 23, and with one overrunning clutch 24 in front, for enabling it to rotate only in the positive direction as soon as multiplication of the motor Torque is not required; and with said casing containing in its central part a co-axial Active Unity 30 integral or connected with the Driving Shaft 1, entering the frontal Hemisphere, and one co-axial Receptive Unity 50, integral or connected with the Driven Shaft 2, which goes out through the center of the rear cover 12;

(2) An Accelerator 30 connected to the Driving Shaft 1, comprising an annular curved channel with an evolutive profile similar to that of a trumpet, whose medium line changes progressively from converging or axial direction at the inlet, to radial direction at the outlet, with inner surfaces 31 and 35 for transmitting axial and tangential acceleration and a Centrifugal Accelerator-Deflector 36 for ejecting the activated mass-flow in the optimum direction as required by the Receptive Unity 50 while transmitting to same the ultimate acceleration;

(3) A Radial Turbine 50 connected with the driven shaft 2, and co-axially mounted with the Accelerator 30, so that its inlet be facing the outlet of same, in order to receive through the accelerated mass-flow the energy provided by the Driving Shaft 1, to the activated fluid, and to restitute it to the Driven Shaft 2;

Relatively to the Casing 10 it must be explained that both co-axial Shells 10 and 13, constituting the Annular Torus, are connected together by a series of guiding surfaces 14 of appropriate profile, taking origin on the rear inner side wall of the cylindrical part of the Casing 11 and oriented in the negative direction but starting to turn in the positive direction while crossing over the outlet of the Radial Turbine 50 and continually turning in converging towards the Central Axis for returning the energetic fluid in the positive direction with the minimum losses of charge, and vanishing at a convenient distance of the Accelerator 30 in the direction corresponding to the optimum angle of attack of the Accelerator' blades' profiles;

By the light of the theory developed page 3 to 5, in order to obtain the Maximum Maximorum Efficiency of the Turbo-Machines of FIGS. 1 and 2, the Compound Accelerator 30 illustrated in profile cut in FIGS. 1 and 2, and in opened 3 dimensional view in FIG. 3, has a structure whose principle consists to accelerate the streamlines of the entering Mass-Flow: $M_o = \rho S V_o$, with a trajectory length as close as possible of its initial velocity $V_o$, for that by virtue of equation (15) the sub-unit Time: $t_{su}$ of the Impulse: $I = F_{x1} t_{su}$ can be as close as possible of the unity, therefore the Impulse as close as possible of its maximum; this Accelerator is denoted from the order of its components: "Helical-Spirally-Centrifugal Accelerator," with components which are in order:

(1) An Helix whose specific Blades 31 connect both the inner and outer Guides 30 and 32; the Blades 31 might be designed for transmit only an Axial Acceleration: $\gamma_{x1}$ to the entering sub-unit-mass flow $M_1$, and in order to do so the Blades 31, illustrated in FIG. 3 can be structured as follows: At a short distance of their peripheral profile located on their outer guide 32, the Blades 31 are radially subdivided in two, or more, elements whose chords' length and relative positions are diverging from their outer guide 32 to their inner guide 30; these subdivided Blades: 31 in the front row, 34, in the rear, are provided with relatively short profiles' chord and zero or small increase of their initial angle of attack $\alpha$, in order to eliminate the slapping effect due to large blades with an angle of attack increasing as going towards the central axis of rotation, that which generates, in an opposite detrimental manner, a turbulent mass flow tangentially accelerated;

Under fulfillment of the above conditions, from Equation (17) the Helix 31 and 34 transmit to the Sub-Unit-Mass-Flow $M_1$ the Axial Elemental Impulse of Equation (13), to which corresponds the Acceleration of Equation (17), and the Axial Velocity: $V_{x1} = \gamma_{x1} t_{su} + V_o$ (2) An Helical-Spiraled-Curved-Primer 35 designed for setting along its trajectory, following a progressive longitudinal and radial process, the Sub-Unit-Mass-Flow $M_1$ in an Irrotational Process; To do so said Primer comprises several spiraled active surfaces 35 taking origin on the inner guide 30 behind the Helix Blades, from which they roll along and around said guide 30 towards the Outlet 37 while their height may either stay constant, or increase, or decrease and, similarly, the rolling direction of the Spiraled Primer 35 on the inner Guide 30 can be either: Positive, with its height increasing in order to become, at a definite distance of the Outlet contour 37, the Deflector 36, connecting both inner and outer Guides 30 and 32, and inclined at the Optimum Angle φ on the tangent AT at the Outlet Contour 37; a solution for a Turbo-Machine whose dimensions are limited; whereas for a non dimensionally limited Machine said Spirally Active Surfaces 35 the rolling direction can be negative, like illustrated in FIG. 3, with its height increasing till a maximum and, either staying constant, or decreasing for vanishing at any convenient point P, like the origin of a separated Deflector 36 directed in the Positive Direction in order to transmit to the Ejected Fluid the Ultimate Acceleration;

The Tangential Acceleration transmitted to the Sub-Unit-Mass Flow $M_1$ by the Spiraled Primer 35, has the form:

$$\gamma_t = \omega(dR/dt) \tag{20}$$

with R=radius of any considered point on the spiral; And both Axial and Tangential Accelerations result in an Helical-Spiraled Trajectory providing the Sub-Mass-Flow $M_1$ with a very much longer distance to run than an axial one alone, while simultaneously increasing the Sub-Unit-Time History: $t_{su}$, of the Elemental Impulse for transmitting the Highest Possible Velocity to the Fluid entering the Activating Field of the Deflector 36 which, in its turn subjects the Sub-Mass-Flow $M_1$ to the Final Centrifugal Force which transmits to same the corresponding Acceleration:

$$\gamma_c = \omega^2 R \tag{21}$$

while ejecting it, in the direction of the Optimum Angle of Attack of the Blades' Profiles of the Receiptive Radial Turbine 50;

Through this process the Radial Turbine 50 receives an Amount of Energy which, expressed through Equation (3) Yields:

$E = (\frac{1}{2})\rho S V_R^3$, where $V_R$ is the Final Resultant Velocity at the Outlet 37 of the Accelerator 36, of the Sub-Mass-Flow $M_1$, velocity corresponding to the initial velocity $V_o$ plus the three Accelerations above defined, expressed as:

$$V_R = V_o + \left( \sqrt{\gamma_{x1}^2 + \gamma_t^2} + \gamma_c \right) t_{su} \tag{22}$$

From which comes out the expression of the transmitted Energy:

$$VE = (\frac{1}{2}) \rho S \left[ V_o + \left( \sqrt{\gamma_{x1}^2 + \gamma_t^2} + \gamma_c \right) t_{su} \right]^3 \tag{23}$$

Figure 7:
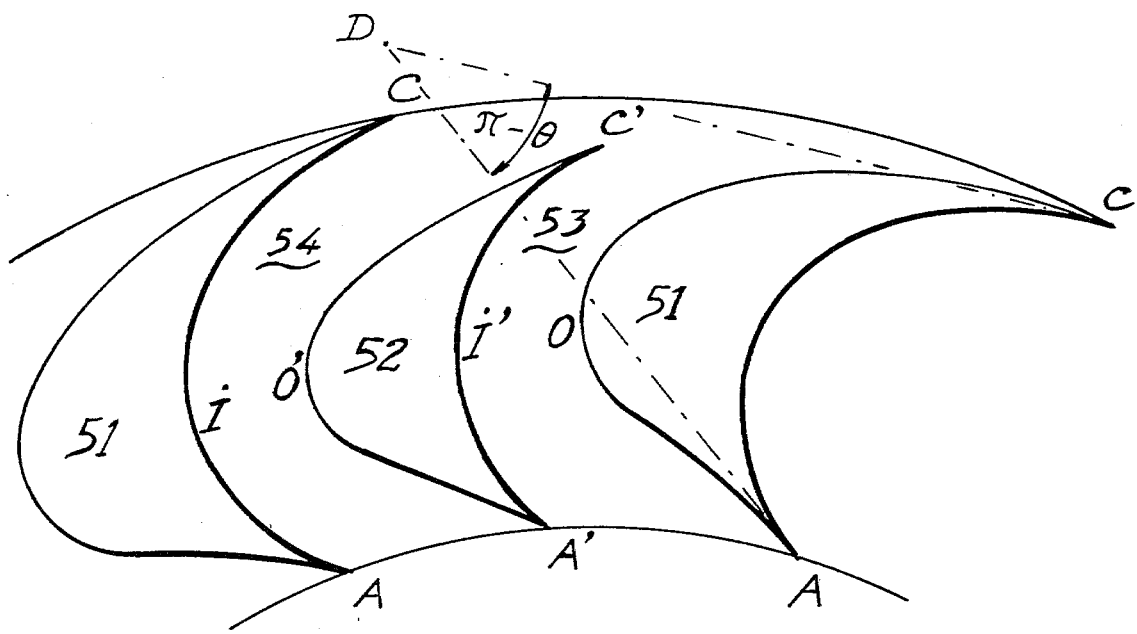
FIG. 7 is an enlarged frontal sectional view of the forms and relative positions of the two types of blades combination constituting a "Composite Turbine"

Equation (23) exhibits like Equation (13) the considerable importance of the Sub-Unit-Time: $t_{su}$, the magnitude of which, in agreement with the theory developed hereinabove, must be maintained as high as possible through the longest, consistent and useful Run inside the Accelerator;

The Helical-Spirally-Centrifugal Accelerator illustrated in FIG. 3, is one example among a lot of possible configurations corresponding to all the combinations of the components forms and relative positions based on the same operational principles; said Components which are illustrated in FIG. 3 in their most theoretical expanded form, but they can be also designed in more compact form as illustrated in FIGS. 5 and 6, where all the separated components of FIG. 3 are integrated in only one while operating on the same specific principles;

It must be specified that the Components like: Helix, Spiraled Primer and Deflector, presented operating all together, can be utilized separately, and that the number of Spiraled Primers 35 is not limited but reduced to two in FIG. 3 in order to easily follow their specific shapes;

The Turbines of the invention, both Radial and Axial, denoted Composite Turbines, operate through new structural concepts illustrated in FIGS. 4 and 7, which enable them to retain the Maximum Maximorum Energy from the Activating Mass-Flow; such Structures comprising two series of alternated Blades:

(A) A first series of "Main Blades" 51, optimally spaced, with a medium profile line as long and curved as compatibly possible, so that the median directions AD and CD of the leading and trailing edges form an outer angle θ which, as an example but non limitatively, may reach the magnitude of: 322 degrees; with their inner surface deeply concave and the contour of their outer convex surface profile as longer as compatibly possible than the inner concave one; with a very sharp angular leading edge positioned for receiving the accelerated mass-flow in the optimum direction; with a very sharp angular trailing edge; or constituted both by the tangential junction of the inner and outer contours of the Blades' Profiles (B) A second series of "Complementary Blades" 52, FIGS. 4 and 7, with each one inserted between each pair of the Main Blades 51, with their Profile Form and Relative Position adapted to those of the Main Blades 51 in order to substitute for the Divergent Channel's Profile constituted by the facing sufaces of two thick, curved, consecutive identical Turbine's Blades; two Channels 53 and 54, whose different and specific Profiles enable said Complementary Blades 52 to fulfill the following Functions:

(A) To accelerate the Activating Fluid-Mass in the Convergent Channel 53, constituted on its right side by the outer surface of contour AOC of the Main Blade's Profile 51, and on its left side by the inner surface of contour A'T'C' of the Complementary Blade's Profile 52.

It must be noticed that the Criterion of Efficiency relative to the Impulse Turbine states that: "As the Fluid leaves the Turbine at the relative velocity zero, all the kinetic energy of the mass flow is transferred to the Turbine;" that which does not agree with the theory of the invention, whose Principle relative to the Energy transferred from a mass-flow to the inner concave surface of a Turbine Blade states that:

"The Energy transferred to a Turbine Blade by the Active Mass-Flow deflected all along its inner concave Profile, is the Work corresponding to the Tangential Displacement of the Blade imposed, through the Mass-Flow, by the Centrifugal Force generated on same by the Curvature of its Trajectory corresponding to the Concavity of said inner Profile, to which is added the Kinetic Energy of the Mass Flow" It comes easily in mind that, as depending upon the design and the relative dimensions, such a Centrifugal Force can be fantastic;

(B) To Maintain at its Initial Magnitude the Velocity of the Activating Fluid Mass in the Channel 54, constituted on its right side by the outer surface of the Complementary Blade 52 of contour: A'O'C', and on its left side by the inner surface of the Main Blade 51 of contour: A IC; Such a condition ensures the Maximum Possible Magnitude of the Velocity Circulation as, in the Circulation Equation:

$$\Gamma = \int_A^{OC} V_o \cos\theta \, dS_o - \int_A^{IC} V_i \cos\theta \, dS_i,$$

in order to generate a Resultant Motive Force as tangential as possible, the outer path: A O C, is designed as greater as compatibly possible than the inner path: A I C, and the accelerated velocity of the Fluid-Mass running along the outer contour A O C in the convergent Channel 53 much greater than the velocity of the Fluid-Mass ejected by the Accelerator 30 along the inner contour A I C; and through this process which constitutes another principle of the invention: The Jets constituted by each one of the Partial-Sub-Mass-Flow ejected quasi-tangentially between each pair of consecutive Blades at very high velocity apply on the Turbine's Blades the Tangential Positive Reaction: $R = -(-mV) = \rho SV^2$; so that the Resultant Tangential Motive Force: $F_R$ which carries in rotational motion the Composite Turbine 50, is the Sum of: the Centrifugal Force $F_C$+the Velocity Circulation+the Reaction of the Ejected Mass-Flow, that which yields:

$$\Sigma F_R = F_C + F + R = \frac{\rho S V_A^3}{r} + \oint V \cos\theta \, dS + \rho S V_F^2 \tag{24}$$

The upper curve of FIG. 8 illustrates the variations of the "Multiplicating Factor of the Driving Torque at the Starting motion of the Composite Turbine," selected for Criterion of the Turbine Efficiency and which confirms through Experimental Results, and in "Open Cycle," with the Accelerator illustrated in FIGS. 5 and 6, and the Composite Turbine of FIG. 4, the promises of the Theory in generating such a Multiplicating Factor $\mu$ of Magnitude equals to: $5.50\mu = 5.50$, that is to say more than 3 Times greater than the magnitude of the Torque Multiplication given by the Hydraulic Components: Pump and Turbine plus "Stationary Part" of the conventional Torque-Converters;

With the Blades' Profiles designed for, all the Principles above defined are available for Composites Turbines operating in gas or liquid; with the Main Blades' Profiles depending upon the nature of the activating fluid and the number and range of variation of the numerous parameters static and dynamic relative to: Dimensions, RPM, Initial Velocity and others, while for the Complementary Blades Profiles all characteristics depend upon the nature of the fluid and upon all the Main Blades' ones; therefore the principles of the invention can be presented under an infinite number of configurations with no limits in blades' profiles' forms and relative positions, as obvious through comparison between the two types of Blades Configurations illustrated in FIGS. 4 and 7;

In addition, in case the Axial and Radial Turbines Blades are fixed only by one end to their rotor, like it is the case for the Axial Turbine 40 in FIG. 1, said Blades may have all the characteristics of the Airplanes Wings described in the U.S. Patent of the author, No.: 2,123,096 (Mar. 23, 1936), particularly the plane form of the trailing edge 43, FIG. 1, curved towards the rear part of the Fixed Body 10; and along their marginal end a Conical Body Tip 45, FIG. 1, which substantially reduces their Profile Drag in attracting within the Potential Vortex generated around same by the rolling on of the natural marginal vortex due to the wing discontinuity, the boundary layer' streamlines from their origin on the leading edge; with such a process available to Radial Blades as well as.

What I claim is:

1. A compound converter of fluid energy comprising:
    a. A fixed body structured for supporting several rotating units and including a co-axial central shaft surrounded by a co-axial central convergent channel having a circular frontal inlet diameter slightly smaller than the fixed body maximum diameter of the fixed body for receiving the upstream activating mass-flow of fluid and having,
    b. An external axial turbine mounted free to rotate on the fixed body and having blades that are radially extended from the outer contour of said fixed body, and receive rotational motion by the activating external mass-flow of velocity $V_o$ passing through the actuator annulus area of said blades when rotating and with the effective energy generated by said external axial turbine being convertable to mechanical form and transmitted to:
    c. An accelerator mounted free to rotate on said fixed body central shaft (a), a mechanical transmission operatively connecting the external axial turbine (b) to the accelerator, the accelerator having an inlet plane facing the outlet plane of the central converging channel (a) with its longitudinal guiding profile changing from axial to radial direction for accelerating axially and tangentially the activating mass-flow of initial velocity $V_o$ entering the frontal inlet of the central converging channel (a) and subjecting it to the final centrifugal force of an accelerator deflector which ejects said mass-flow in the optimum direction required by the receptive unity while transmitting to it the ultimate acceleration; and
    d. A radial turbine having a cylindrical inlet and having a center support hub shaft, said radial turbine being mounted co-axially with the accelerator and free to rotate on the said central fixed shaft (a), with its cylindrical inlet facing a corresponding outlet of the accelerator (c) in order to receive through the central mass-flow ejected by same the "total effective energy retained by the turbomachine from the activating mass-flow passing through the central and annulus actuators' areas," and to convert energy to mechanical form on its own central support hub shaft prolonged beyond its bearing for connection to an output means; and with the radial turbines' outlet facing the inlet of a rotating collector integral with the external axial turbine, structured for ensuring an efficient final phase of the mass-flow ejection.

* * * * *